United States Patent
Rangarajan

[11] Patent Number: 5,987,514
[45] Date of Patent: Nov. 16, 1999

[54] SYSTEM AND METHOD FOR ADVANCED EVENT REQUEST MANAGEMENT FOR NETWORKS

[75] Inventor: Govindarajan Rangarajan, Sunnyvale, Calif.

[73] Assignee: Sun Microsystems, Inc., Mountain View, Calif.

[21] Appl. No.: 08/741,476

[22] Filed: Oct. 30, 1996

[51] Int. Cl.$^6$ .................................................. G06F 15/177
[52] U.S. Cl. ............................................. 709/224; 714/48
[58] Field of Search ......................... 395/200.53, 200.54, 395/825, 835, 837, 838, 389; 714/48, 57

[56] References Cited

U.S. PATENT DOCUMENTS

| | | | |
|---|---|---|---|
| 5,491,796 | 2/1996 | Wanderer et al. | 395/200.53 |
| 5,655,081 | 8/1997 | Bonnell et al. | 395/200.53 |
| 5,751,963 | 5/1998 | Umetsu | 395/200.53 |
| 5,809,238 | 9/1998 | Grenblatt et al. | 395/200.53 |
| 5,822,534 | 10/1998 | Yamunachari et al. | 709/223 |
| 5,892,898 | 4/1999 | Fujii et al. | 714/57 |

FOREIGN PATENT DOCUMENTS 408286989  11/1996  Japan.

*Primary Examiner*—Dung C. Dinh
*Attorney, Agent, or Firm*—Pennie & Edmonds LLP

[57] ABSTRACT

A network manager automatically sends certain requests in response to selected events generated by network devices. When a device generates an event, the network manager can send stop requests to the device; send different event requests to the device; or send the same event request to the device, but over a different path. The stop request is sent to cut down on network management traffic. The different event requests can be sent to determine why the event was generated by the device in the first place. The same event request can be sent over a different path to determine whether a problem exists with the device itself or with the path to the device.

19 Claims, 7 Drawing Sheets

SYSTEM AND METHOD FOR ADVANCED EVENT REQUEST MANAGEMENT FOR NETWORKS

The present invention relates generally to network management and particularly to event request processing.

BACKGROUND OF THE INVENTION

Today, large numbers of personal computers and workstations are being interconnected with devices such as file servers, print servers, modems and hubs to form local area networks, metropolitan area networks and wide area networks. These networks allow the personal computers and workstations to share information and valuable resources among each other. Now more than ever, individuals and companies depend on networks to conduct business and to communicate with people around the world. Indeed, the network has become the computer.

Most networks use a network manager and some type of network management protocol such as Simple Network Management Protocol (SNMP). Among its management tasks, the network manager automatically monitors the health of the devices on the network. This can be done by sending an event request to an agent of the device. Each event request directs one or more agents to monitor a device attribute against error conditions. If the error conditions are satisfied, an event is generated. In addition, an event report is generated that returns the value of the device attribute to the network manager. For example, the network manager sends an SNMP event request to a workstation. The event request specifies the attribute sysUpTime (which indicates the length of time a device has been running), the relational "Less Than" and a threshold (e.g., 1). Such an event request might be sent to determine if the workstation is operational. If sysUpTime is greater than the threshold, the workstation is deemed operational. However, if sysUpTime is less than the threshold, an event is generated. In response, the network manager sounds an alarm, sends an e-mail message, displays visual effects or takes some other action indicating that the workstation is down.

However, these actions are all signaling actions. They reveal nothing about why the workstation was not operational. Did a port test fail? Was disk availability above a threshold? Was the CPU usage too high? A general event request for an attribute such as sysUpTime does not give the exact details. Thus, the network administrator must take the time to request data from the device and/or visually inspect the device.

Not only can the event requests and reports be unrevealing, but they can be problematic as well. For example, an event request can require sysUpTime to be monitored at regular intervals of 60 seconds. If the workstation is down for a lengthy period of time, the attribute will be polled a total of 60×24 times each day, and 1440 event reports will be returned from the device each day. This results in unnecessary network management traffic and an unnecessary source of distraction for the network administrator.

It is an object of the present invention to provide a method and system that efficiently monitors a network of computing devices.

It is another object of the present invention to provide a method and system that efficiently monitors a network of computing devices through the use of event requests.

It is an object of the present invention to provide a network management method and system that ascertains the nature of an event through the generation of one of more additional event requests.

It is a further object of the present invention to provide a network management method and system that stops the generation and transmission of redundant events.

It is another object of the present invention to provide a method and system that provides an alternate route for transmitting event requests to one or more network devices.

It is a further object of the present invention to provide a method and system as described above that minimizes network traffic.

Other general and specific objects of this invention will be apparent and evident from the accompanying drawings and the following description.

SUMMARY OF THE INVENTION

The present invention pertains to a system and method for managing a network of devices. A network manager is connected to the network and tracks the activity of the various devices. The network manager utilizes a query response model where the network manager generates event requests and where a mid-level managing agent (or mid-level manager) responds to the requests. An event request is a request that directs the mid-level manager to poll a device during a prescribed interval to ascertain an attribute of the device against one or more error conditions. If the error condition is met, the event is generated. The mid-level manager also generates an event report that is forwarded to the network manager indicating the value of the polled attribute.

The network manager can respond to the event in a number of ways. First, the network manager can initiate a stop event request that directs the mid-level manager to cease polling the device. This will alleviate the affected device from continuously generating redundant event reports during the polling interval. In addition, the network manager can generate one or more additional event requests to ascertain the nature of the event. Each subsequent event request can retrieve an additional attribute of the device that can be used to troubleshoot the cause of the event. Furthermore, the network manager can send event requests through an alternate proxy agent (mid-level manager). This is useful in determining whether the device or an element in the path to the device has a problem.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Glossary

To assist the reader, the following glossary of terms used in this document is provided.

SNMP: Simple Network Management Protocol which pertains to a protocol, defined data structures, and concepts for network management. It is one of standard protocols for Internet network management. SNMP utilizes a query-response model that has a network manager generate queries and a mid-level manager that responds to the queries. The present invention is described with reference to SNMP. A more detailed description of SNMP can be found in W. Stallings, SNMP, SNMPv2 and RMON, 2d ed., Addison-Wesley Publishing Co., (1996), which is hereby incorporated by reference, as background information.

Event: An occurrence within a device that signifies an error condition (e.g., fault).

MIB: Management Information Base (MIB). Resources in the network are represented as objects. A collection of these objects is listed in the MIB.

Associated with each object are one or more attributes. Each attribute represents a characteristic of the object (e.g., the number of physical ports on a router). The network manager monitors each object by retrieving one or more attribute values associated with each object. The MIB stores the attribute values associated with each object.

Event request: A request that directs a mid-level manager to poll a device during a prescribed interval to ascertain an attribute of the device against one or more conditions. The mid-level manager generates an event report that is forwarded to the network manager when the condition occurs and which includes the value of the requested attribute.

Agent: A procedure that gathers and records management information for one or more devices that is communicated back to a requesting manager.

Mid-level manager: A mid-level agent that receives event requests from the network manager. One class of mid-level managers performs the basic monitoring function of retrieving attribute values from one or more low-level agents that are under the mid-level manager's control during the specified polling interval. Another class of mid-level managers retrieves attributes from the machine in which they reside by using system routines (APIs). The attribute values are compared with the conditions specified in the event request. When a value satisfies a condition, the mid-level manager forwards the network manager an event report signifying the occurrence of the event.

Low-level agent: An agent that retrieves the value of the requested attribute from the MIB associated with the device which is forwarded to the mid-level agent or manager.

Proxy-agent: A mid-level manager that retrieves information from more than one device.

System Architecture

Figure 1:
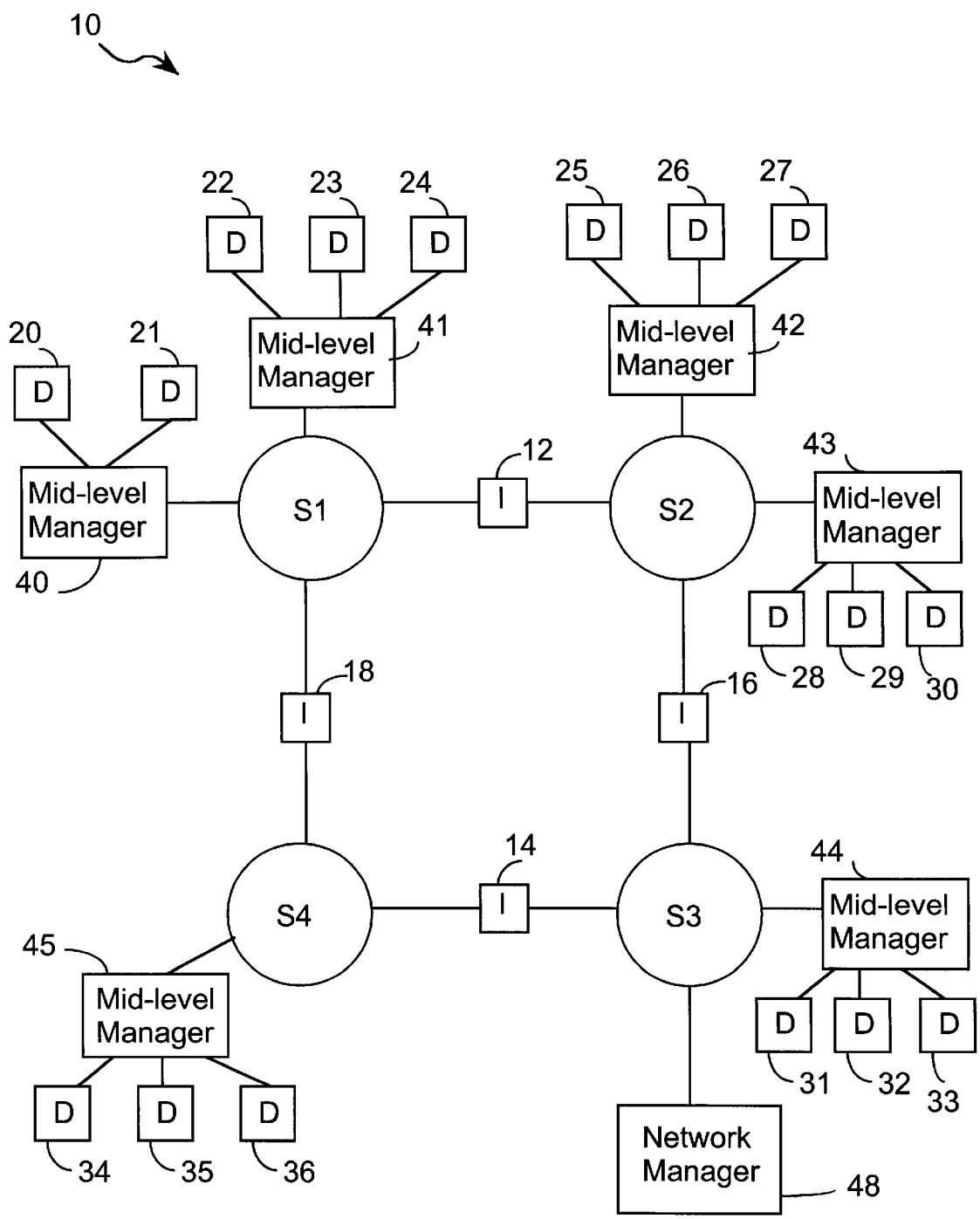
FIG. 1 is a schematic diagram of a network according to a preferred embodiment of the present invention.

FIG. 1 shows a network 10 including first, second, third and fourth subnets S1, S2, S3 and S4 that are interconnected by intermediate systems 12, 14, 16 and 18. The intermediate systems 12–18 can include bridges and routers. The subnets S1, S2, S3 and S4 can have the same topology or they can have different topologies. The topologies include, but are not limited to, Token ring, Ethernet, X.25 and FDDI. Devices 20, 21, 22, 23, 24, 40 and 41 are connected to the first subnet S1; devices 25, 26, 27, 28, 29, 30, 42 and 43 are connected to the second subnet S2; devices 31, 32, 33, and 44 are connected to the third subnet S3; and devices 34, 35, 36, and 45 are connected to the fourth subnet S4. The devices 12–45 can be workstations, personal computers, hubs, printers, network adapters, multiplexers, etc.

Each device 12–45 has a physical address and a unique Internet protocol (IP) address. The TCP/IP and UDPI/IP protocols can be used to regulate how data is packeted into IP packets and transported between the devices 12–45.

The network 10 also includes a network manager 48 that is connected to the third subnet S3. Simple Network Management Protocol (SNMP) is used by the network manager 48 for managing the devices 12–45 that support SNMP. The devices 12–45 that do not support SNMP can be managed by a protocol such as Internet Control Message Protocol (ICMP).

A number of the devices represent mid-level managers 40–45 that perform the basic monitoring function of retrieving information from one or more devices that are under the mid-level manager's control. For example, mid-level manager 40 communicates with devices 20 and 21. Similarly, mid-level manager 45 of subnet S4 communicates with devices 34, 35, and 36.

Figure 2:
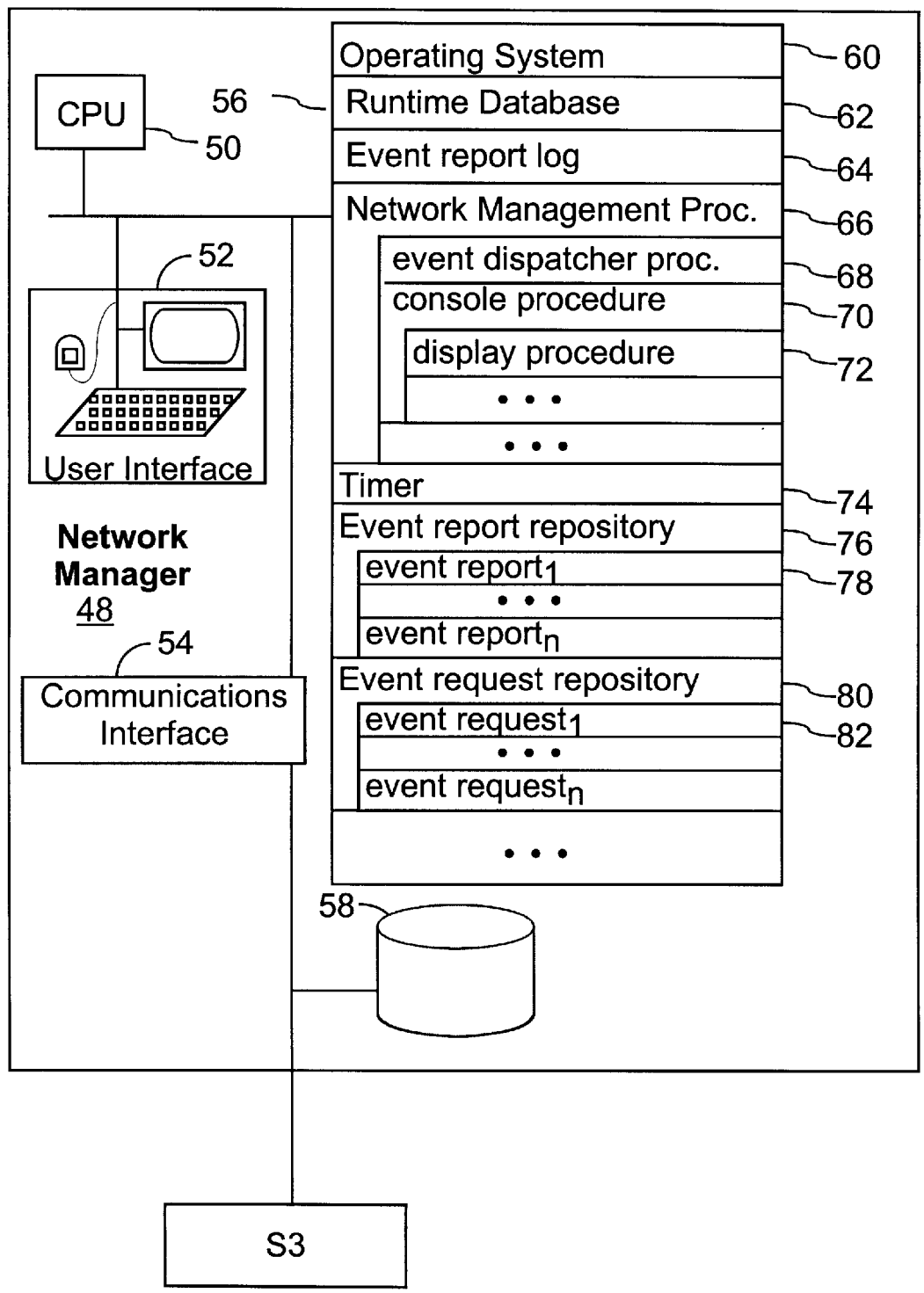
FIG. 2 is a block diagram of the network manager according to a preferred embodiment of the present invention.

FIG. 2 illustrates the network manager 48 in greater detail. The network manager 48 can be a personal computer or workstation. The network manager 48 includes a central processing unit (CPU) 50, a user interface 52, a communication interface 54, a primary memory 56 and a secondary storage 58. The user interface can consist of a keyboard, mouse, color display, or other type of input/output device that can be used to interface with the network manager. A network administrator utilizes any one of the user interfaces to interact with the network manager 48. The communications interface 54 is used to communicate with one or more subnets. The secondary memory 58 can be any type of non-volatile storage including but not limited to magnetic disk storage.

The primary memory of the network manager 48 can contain the following:

- an operating system 60;
- a runtime database 62 that stores information relating to the content and scheduling times of the event requests for the devices 12–45;
- an event report log 64 that lists information identifying each received event report;
- a network management procedure 66 that monitors the activities of the network devices;
- a timer procedure 74 that generates a time stamp;
- an event report repository 76 that stores one or more received event reports 78;
- an event request repository 80 that stores one or more outgoing event requests 82;
- as well as other procedures and data structures.

The network management procedure 66 can contain the following:

- an event dispatcher procedure 68 that receives event reports and forwards them to other procedures and applications, including the console procedure 70;
- a console procedure 70 that provides visual and audio notification of the event reports to the network administrator or other users. The console procedure 70 can contain a display procedure 72 that is used to display the event reports 78;

as well as other procedures and data structures.

Figure 3A:
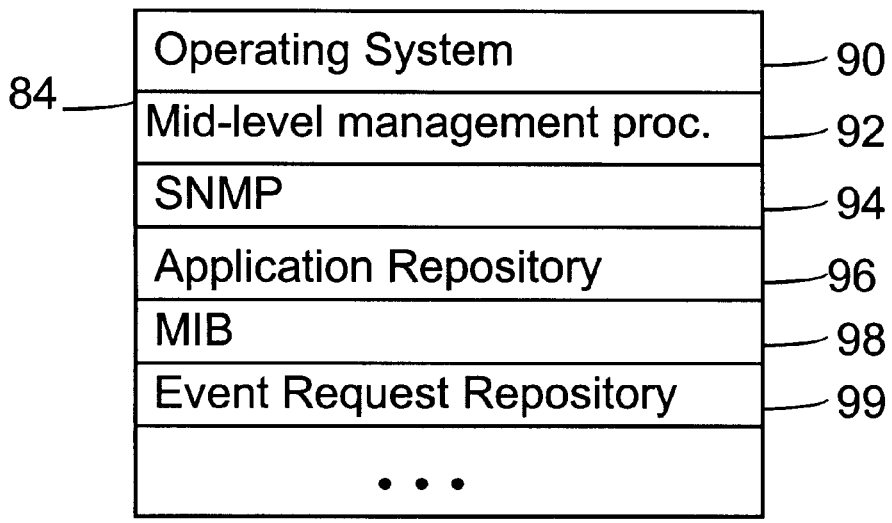
FIG. 3A illustrates an exemplary memory organization of the mid-level manager shown in FIG. 1.
Figure 3B:
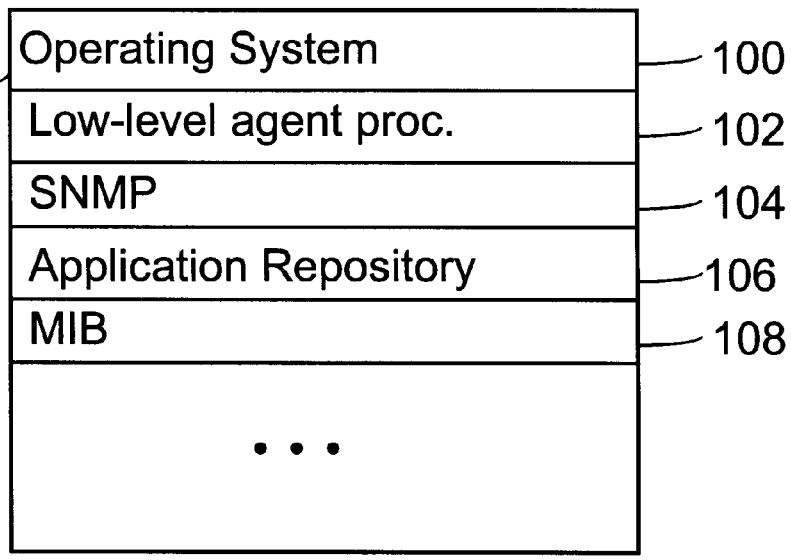
FIG. 3B illustrates an exemplary memory organization of one or more devices shown in FIG. 1.

FIG. 3A illustrates a memory configuration for those devices acting as mid-level managers 40–45 and FIG. 3B illustrates a memory configuration for those devices acting as agents 12–36.

The primary memory 84 for a mid-level manager 40–45 can contain the following:

an operating system 90;

a mid-level agent procedure 92 that receives event requests 82 from the network manager 48 and polls the appropriate devices under its control for the requested information;

SNMP procedures 94;

an application repository 96 that stores one or more applications;

MIB 98 that contains node-specific information as well as summary information about the agents under the mid-level manager's control;

an event request repository 99 that stores one or more received requests; and other procedures and data structures.

The primary memory 85 for devices 12–36 can contain the following:

an operating system 100;

an agent procedure 102 that gathers and records management information for one or more devices that is communicated back to a requesting manager;

SNMP procedures 104;

an application repository 106 that stores one or more applications;

a MIB 108 that stores attributes for the associated device; and other procedures and data structures.

Network Manager

The network manager 48 generates regularly scheduled event requests 82 to mid-level managers 40–45 in order to ascertain the status of the devices associated with the mid-level managers 40–45. Each device is represented as an object and has associated with it one or more attributes that characterize the device. An attribute can include the name of a device, the address of the device, one or more operational characteristics of the device, etc. Associated with each attribute is a value. Each event request 82 requests an attribute value, an interval during which the attribute is continuously polled, and at least one condition for the attribute. When the attribute of a device satisfies a condition specified in one of the event requests 82, an event is generated in the form of an event report 78 that is transmitted to the network manager 48. In response to the event report 78, the network manager 48 notifies a network administrator of the event by performing a signaling action, such as sounding an alarm. Furthermore, the network manager 48 can also respond to the event as follows:

(1) It can stop the mid-level manager 40–45 from polling the attribute of the device by issuing a "stop" event request to the appropriate mid-level manager. This action, in turn, stops additional events from being generated. As a result, network management traffic is reduced.

(2) It can send a second event request to the device. The second event request could examine another attribute of device, one that may be more revealing of why the event was generated by the device. If an event condition is met for the given attribute, a second event request could be followed by a third event request which could examine yet another attribute of the device. The third event request could be followed by a fourth event request and so on, resulting in a chain of event requests that examine different attributes of the device. If the device is a workstation, and an event was generated for the attribute sysUpTime (i.e., the workstation went down), the second event request could examine the workstation's attribute for disk usage, the third event request could examine the workstation's attribute for CPU usage, and so on. This chain of actions allows troubleshooting to be performed remotely, automatically and conveniently.

(3) It can send the same event request to the device, but over a different path. This action can be performed by sending the event request to a different agent which in turn communicates to the device. This is another troubleshooting action that determines whether the device is bad or the path (e.g., a physical link, agent, router) to the device is bad.

(4) It can take no action at all. Polling of the device attribute would continue at regular intervals, events for the device would continue to be generated at regular intervals, and event reports 78 would continue to be sent to the network manager 48 at regular intervals.

Figure 4:
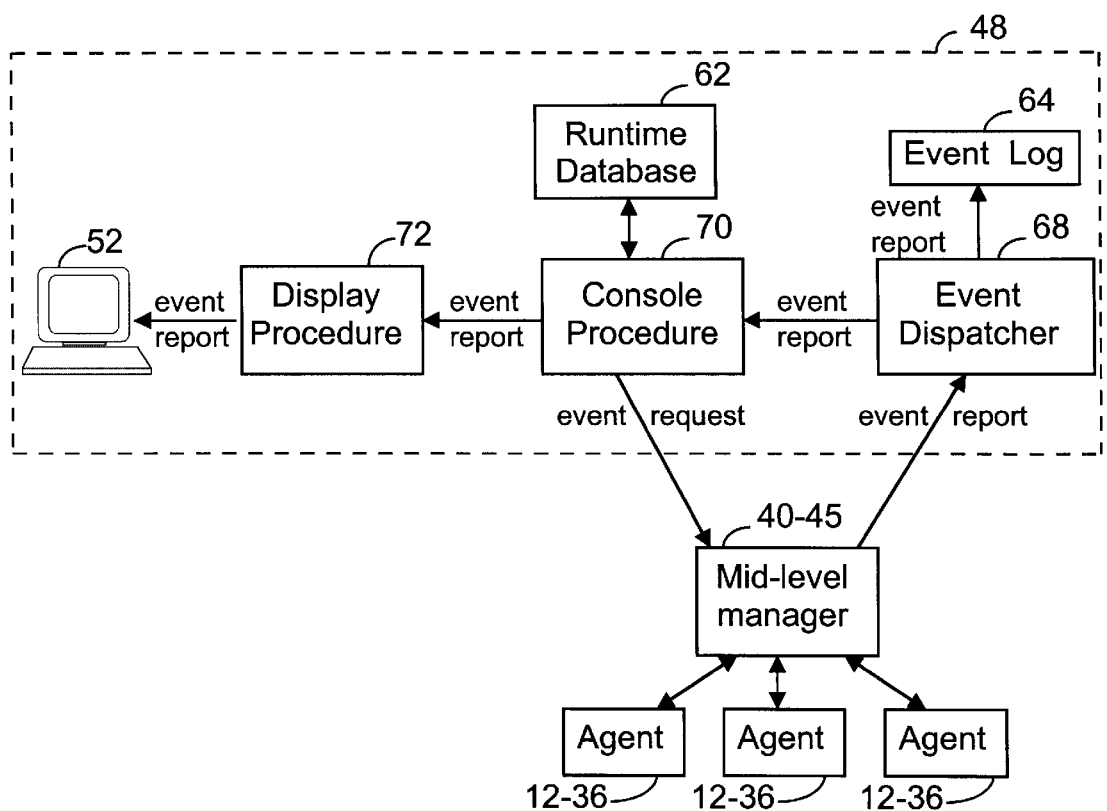
FIG. 4 illustrates the interactions between the various procedures responsible for managing the network according to a preferred embodiment of the present invention.

Reference is now made to FIG. 4, which illustrates the interactions between the various procedures monitoring the devices in the network 10. The network manager 48 interacts with a plurality of mid-level managers 40–45 that can reside in the same machine as the network manager or in one or more other machines. The mid-level managers 40–45 gather information from the various devices, compare the information to certain conditions, and generate events when the conditions are satisfied. These mid-level managers 40–45 can communicate with their devices using an appropriate protocol.

A mid-level manager 40–45 receives a number of event requests 82 from the network manager 48. The mid-level manager 40–45 stores the attribute, condition(s) and polling interval for each event request. Then the mid-level manager 40–45 directs a low-level agent 12–36 to retrieve values for the specified attribute. This can be done by continuously sending SNMP commands such as GetNext to that low-level agent 12–36 at the specified intervals. The low-level agent 12–36 retrieves the values from the device's Management Information Base (MIB) 108. The low-level agent 12–36 returns the value to the mid-level manager 40–45 which determines whether the value satisfies the specified conditions. If it does, the mid-level manager 40–45 generates an event report 78 and sends the event report 78 to the network manager 48.

The Event Dispatcher 68 receives all of the event reports 78 and forwards them to the Console procedure 70. The Event Dispatcher 68 also keeps a log 64 of the event reports.

The runtime database 62 includes an Event Request record, which incorporates one or more Attribute records for each event request that is generated by the Console procedure 70. Both types of records provide information that allow an event request to be generated and scheduled. An Event Request record includes the following fields:

| Type | Field Name |
| --- | --- |
| string | Request Name |
| string | Proxy System |
| string | Agent Name |
| string | Name of Device |
| integer | Reporting Interval |
| integer | Count |
| string | Alternate Proxy to be used |
| string | Start date |
| string | Stop date |
| string | Start time |
| string | Stop time |
| list | Attribute Records |

The field "Proxy System" indicates the machine in which the proxy agent resides. This field is applicable only for proxy agents. The field "Agent Name" is the name of the mid-level manager. The field "Name of Device" indicates the device to which the event request is sent. The "Count" field indicates the number of times the request is to be made. The field "Alternate Proxy" identifies a mid-level manager along a different path. If the Alternate Proxy field is filled in and an event is generated, the same event request will be sent to the mid-level manager identified in the Alternate Proxy field. The mid-level managers are identified by their host names. The Alternate Proxy field is applicable only if the specified mid-level manager is a proxy agent.

The fields "Start Date", "Stop Date", "Start Time" and "Stop time" indicate when the event request is started and stopped. The field "Report Interval" indicates the interval between polling requests from the mid-level manager 40–45 to the low-level agent 12–36. A value of 60, for example, indicates that the polling should be performed at regular intervals of 60 seconds.

Each Attribute record can store one or more conditions for an attribute that is to be monitored. An Attribute record has the following fields:

| Type | Field Name |
| --- | --- |
| string | Attribute |
| enum threshold | Relation 1 |
| string | Threshold1 |
| enum threshold | Relation 2 |
| string | Threshold2 |
| boolean | Stop Request when an event occurs against this attribute |
| string | Start Request when an event occurs against this attribute |

The "Attribute" field indicates the attribute to be monitored. The fields "Relation1" and "Threshold1" allow a first condition to be specified, and the fields "Relation2" and "Threshold2" allow a second condition to be specified. The strings for Relation1 and Relation2 can include phrases such as "Greater than", "Less than", "Equal to", etc. If the field for only one condition is filled, an event will be generated if the monitored attribute satisfies that condition. If the fields for both conditions are filled, an event will be generated if the attribute satisfies either condition.

The "Stop Request" field, if checked off, stops the polling of the attribute when an event occurs (i.e., when a monitored attribute satisfies a specified condition). The "Start Request" field specifies another event request that should be fired. If "Start Request" field is filled in and an event occurs against this attribute (i.e., the monitored attribute satisfies a specified condition), the event request specified in the Start Request field will be generated and fired. The Start Request field allows multiple event requests to be chained for troubleshooting purposes. If the stop request is checked off, the current event request is stopped.

Figure 5A:
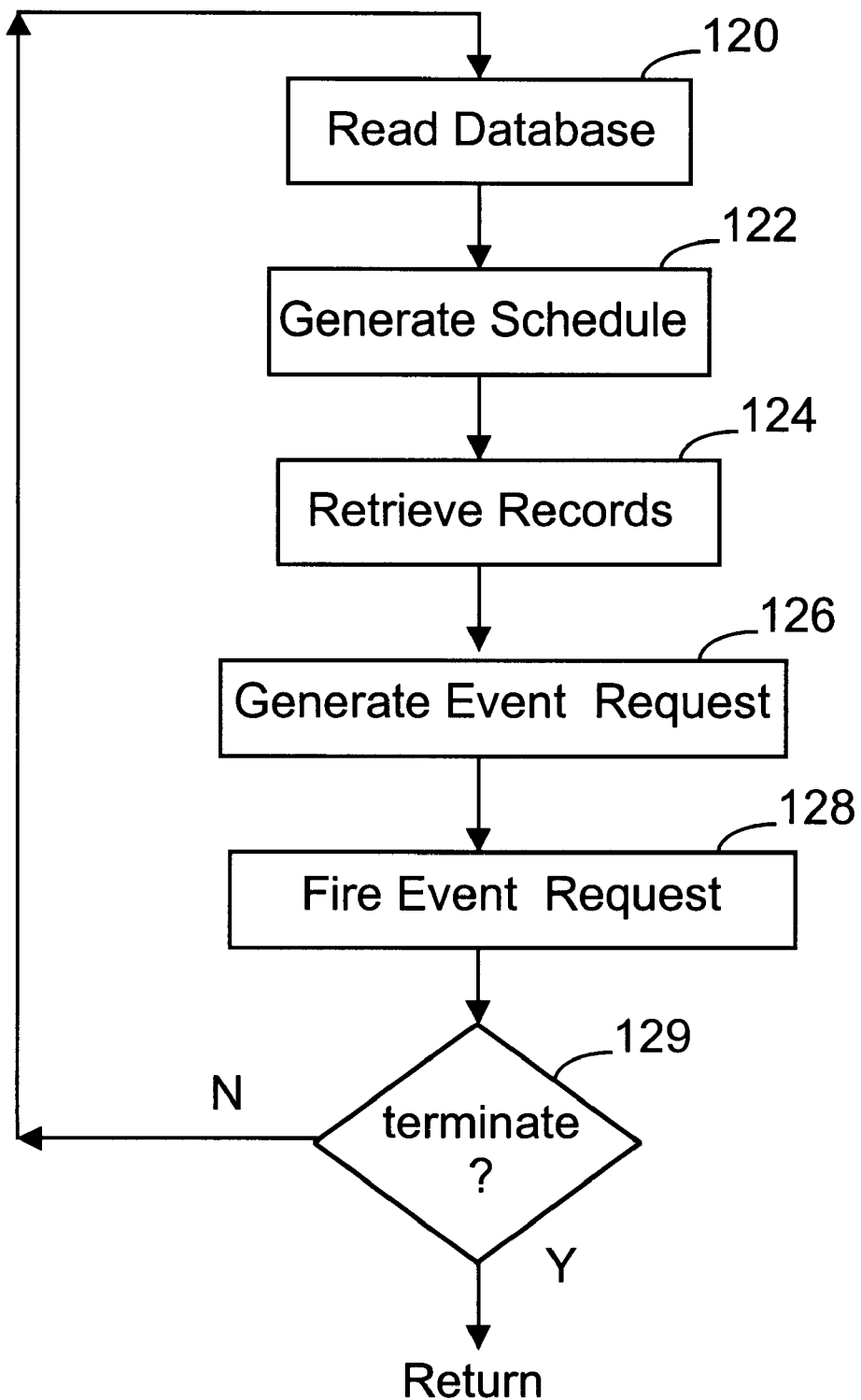
FIGS. 5A and 5B are flowcharts of the steps performed by the Console procedure shown in FIGS. 2 and 4.

Referring to FIG. 5A, the Console procedure 70 reads the Event Request records in the runtime database 62 for start/stop times and dates of the event requests to determine which event requests should be fired (step 120) and generates a schedule for firing the event requests at their indicated start times (step 122). The Console procedure 70 uses the network manager's internal timer 74 to determine when it is time to fire an event request.

Before it is time to fire an event request, the Console procedure 70 retrieves the Event Request and Attribute records for that device from the runtime database 62 (step 124). Using the information in the Event Request and Attributes records, the Console procedure 70 generates an event request (step 126). An event request can contain the following fields: the name of the event request, a destination address, interval, count, and a list of attributes records having the threshold conditions (conditions). The destination address is filled in by a separate procedure that translates the host name into an IP address. The attribute records list is filled in with the attribute, relational(s) and threshold (s) specified in the Attribute records.

At the scheduled start time, the event request is fired by the Console procedure 70 (step 128). The mid-level manager 4045 receives the event request and instructs the low-level agent 12–36 to retrieve values for the requested attribute at regular intervals. The steps 120–128 can be repeated (step 129-Y) or terminated (step 129-N) as desired.

Figure 5B:
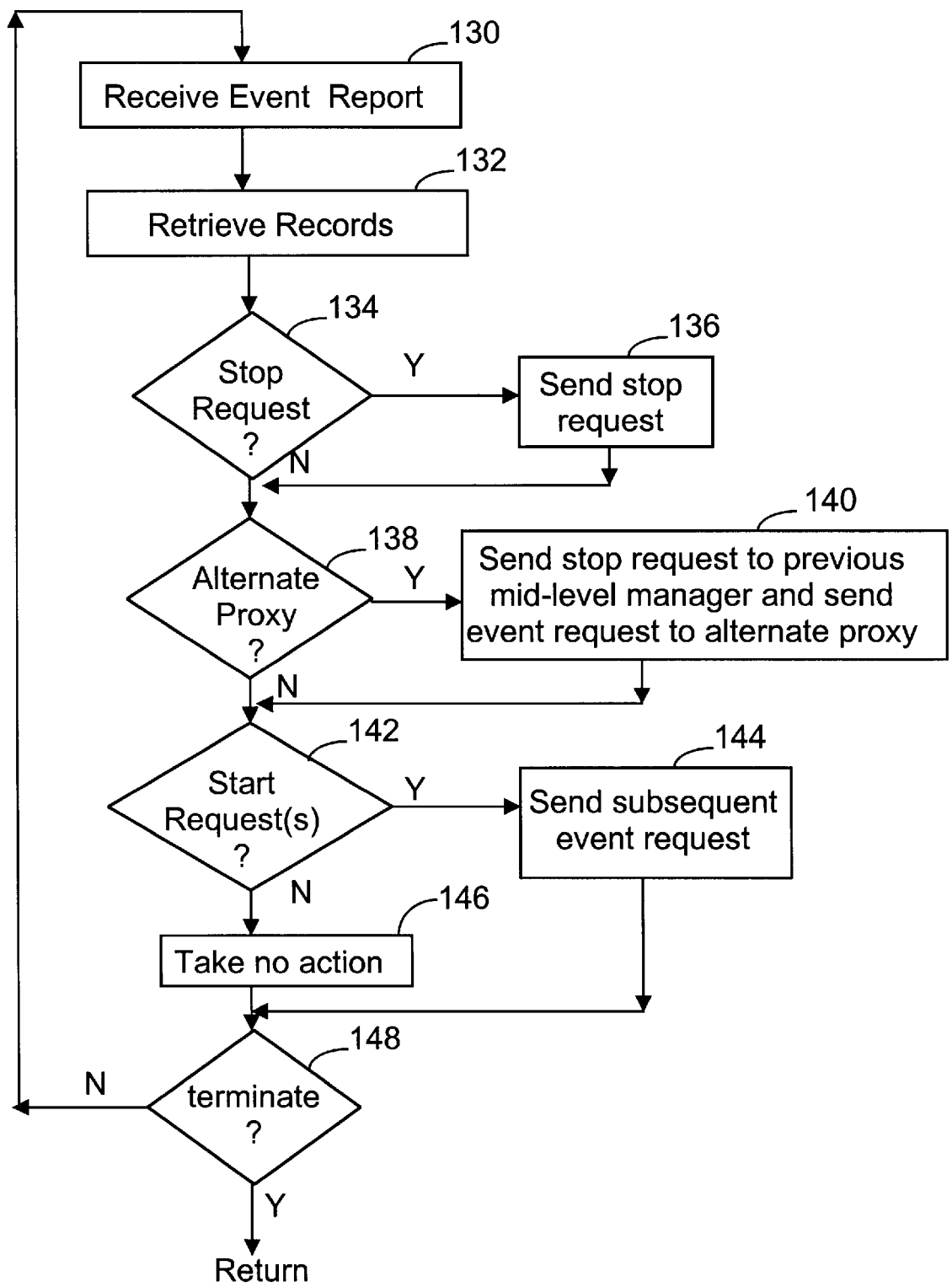

Referring to FIG. 5B, when the attribute satisfies a condition in the event request, an event report 78 is generated which is received by the Event Dispatcher 68. The Event Dispatcher 68 logs the event report 78 in the event log 64 and then forwards it to the Console procedure 70 (step 130). The Console procedure 70 receives the event report 78 from the Event Dispatcher 68 and stores the event report 78 for display (step 130). The network administrator can view the event report 78 via the Console procedure 70.

When the Console procedure 70 receives an event report 78, it retrieves the appropriate Event Request and Attribute records for that event request (step 132) and takes the action (if any) specified in those records. If the Stop Request field in the Attribute record is checked off (step 134), the Console procedure 70 sends a "stop" event request to the mid-level manager 40–45, commanding the mid-level manager 40–45 to stop polling for the attribute value (step 136).

If the Alternate Proxy field in the Event Request record is filled in (step 138), the Console procedure 70 sends the same event request to the mid-level manager 92 specified in the Alternate Proxy field (step 140). An alternate proxy delegates a mid-level manager. Once the alternate proxy is delegated, the previous mid-level manager is disengaged by sending a stop event request to the previous mid-level manager(s) (step 140).

If the Start Request field in the Attribute record specifies an event request (step 142), the Console procedure 70 generates the specified event request and fires it (step 148). For example, if the Start Request field for the sysUpTime event request specifies "Disk Availability", the Console procedure 70 will retrieve the Event Request and Attribute records for the Disk Availability event request, and immediately generate and fire such an event request. By making appropriate selections in the Start Request fields, the network administrator can send a chain of event requests to determine why a device had an error condition. Thus, the sysUpTime event request can be followed by the event request for disk space availability, which can be followed by an event request for CPU utilization, which can be followed by an event request for port tests, and so on. Furthermore, since an Event request record can include more than one Attribute record, more than one Event request may be generated in response to a single event report. Also, multiple Attribute records can be used to generate different Event requests in response to different reported attribute values.

If none of the fields (e.g., Start, Stop and Alternate Proxy fields) are filled in or checked off, the network manager 48 takes no action (step 146). The attribute continues to be polled, and event reports 78 continue to be generated for as long as the conditions specified in the event request 82 are satisfied.

When the Console procedure 70 is terminated (step 148), the network administrator is notified of all event requests 80. All event requests 80 are terminated when the Console procedure 70 is terminated.

The Console procedure 70 includes an object-oriented, graphical user interface (GUI) for modifying the Event Request and Attributes records in the runtime database 62. The GUI can be derived from OpenWindows™ 3.1 or later or any other library of classes for GUIs. To modify a record, the Console procedure 70 displays the fields for an event request (the fields of an Event Request record and one or more Attributes records can be combined into a single display) and allows the network administrator to fill in or change the fields. The modified records are saved, and the Console procedure 70 is restarted.

Figure 6:
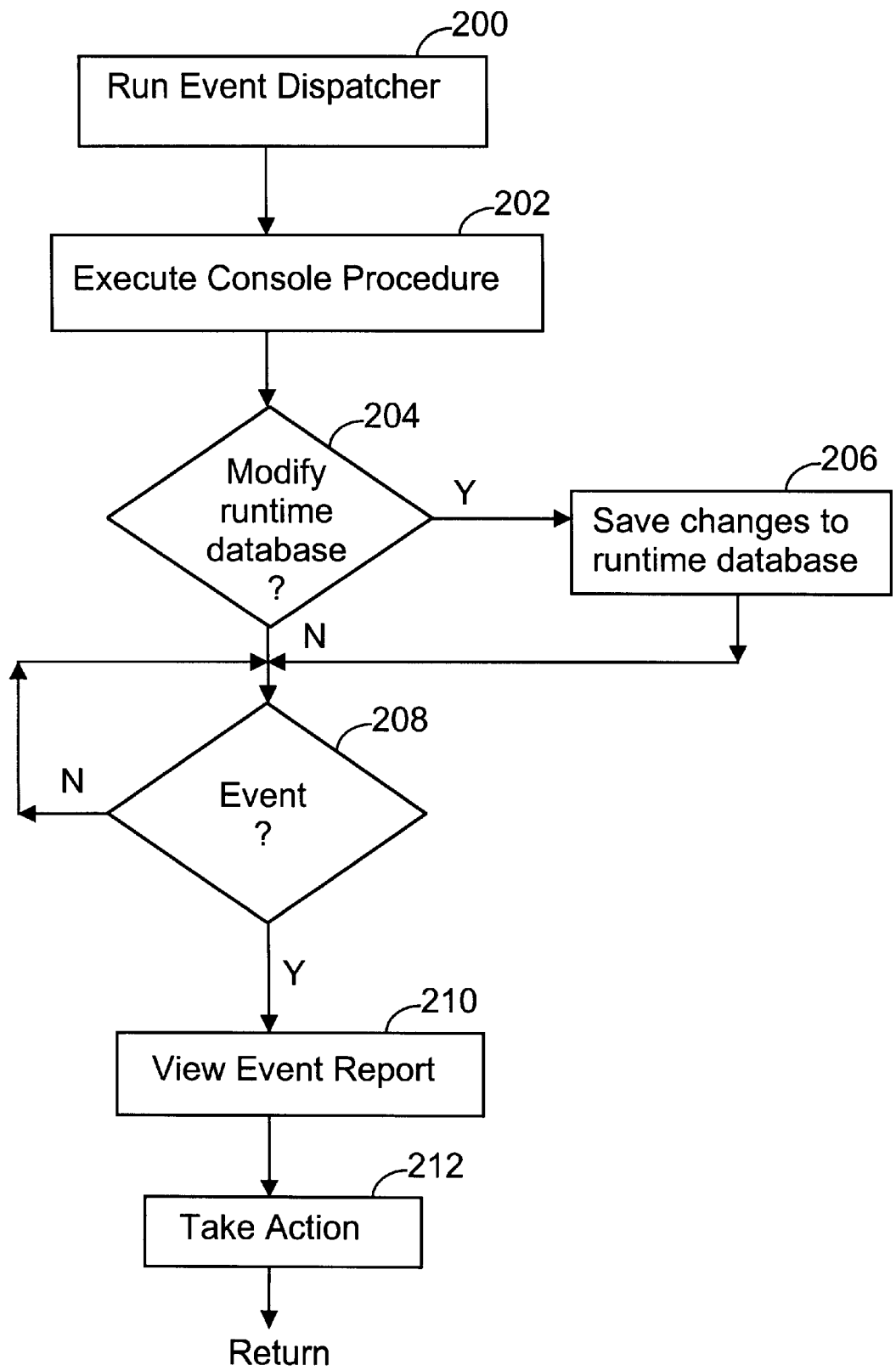
FIG. 6 is a flowchart of the steps performed by a network administrator while using the Console procedure.

Reference is now made to FIG. 6, which shows the steps performed by a network administer while using the Console procedure 70. First, the Event Dispatcher 68 is run in the background (step 200) and then the Console procedure 70 is executed (step 202). Upon execution, the Console procedure 70 registers with the Event Dispatcher 68, informing the Event Dispatcher 68 to forward event reports 78 to it.

If any of the records in the runtime database 62 need to be modified (step 204), the network administrator modifies and saves the records in the runtime database 62 (step 206). The Console procedure 70 begins firing event requests 82 at their scheduled start times.

If an event is generated (step 208), the network administrator can view the corresponding event report 78 via the Console procedure 70 (step 210). The event report 78 indicates the attribute and conditions for which the event was generated, the course of action taken by network manager 48, and the results (if any) from actions taken.

If the event report 78 indicates that the device was down because CPU usage was too high, or because a router on the path was not operational, the network administrator can take the appropriate actions (step 212). If polling of the device attribute has been stopped, no remedial further event reports 78 will be generated for the device.

Thus disclosed is an invention that reduces network management traffic and performs troubleshooting automatically and conveniently from a remote location. The invention greatly reduces the burden of managing a network.

It is understood that various changes and modifications may be made without departing from the spirit and scope of the invention. Moreover, the invention is not limited to SNMP, nor is it limited to the specific actions and sequences shown in FIGS. 3–5. Accordingly, the present invention is not limited to the precise embodiments described hereinabove. Instead, the invention is defined by the claims that follow.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

I claim:

1. A computer-implemented method of monitoring a network of devices, comprising the steps of:

providing each of said devices with one or more agents that are in communication therewith, each agent used to ascertain information about one or more associated devices;

for each of a subset of said devices, transmitting an event request to a specified agent associated with a specified one of said devices in said subset, said event request instructing said specified agent to poll said device for an occurrence of an event and to generate an event report when said event occurs;

receiving one or more event reports, each event report received from a respective agent associated with a respective event-affected device; and responding to a received event report from said respective agent for said respective event-affected device by automatically sending one or more additional event requests to the respective agent associated with said respective event-affected device, each of a first subset of said additional event requests instructing a particular agent to terminate polling said associated device for said corresponding event, each of a second subset of said additional event requests instructing a specified agent associated with a respective event-affected device to obtain additional information concerning a corresponding event.

2. The method of claim 1, performing a remedial action corresponding to at least one of said received event reports.

3. The method of claim 1, acquiring one or more additional event reports from said agents associated with said respective event-affected device, each additional event report responding to a corresponding one of said second subset of additional event requests.

4. The method of claim 1, a subset of said agents associated with each of said devices including one or more proxy agents; and wherein at least one of said additional event requests is sent to one of said proxy agents.

5. The method of claim 1, displaying one or more of said received event reports.

6. A computer-implemented method for managing a network of devices, comprising the steps of:

associating each of said devices with one or more agents that are in communication with each said device, each said agent used to ascertain information about one or more associated devices;

providing a database including a plurality of records used to generate one or more event requests for one or more of said devices, each said event request associated with a particular one of said devices and instructing an agent associated with said particular device to poll one of said devices for an occurrence of an event, each said event request including a stop request field, each said stop request field specifying a stop event request that is sent to said particular device's associated agent to terminate said polling;

generating one or more event requests from said database records;

receiving one or more event reports, each event report received from a respective agent associated with a respective event-affected device;

responding to a received event report from said respective agent for said respective event-affected device by automatically sending one or more additional event requests to the respective agent associated with said respective event-affected device in accordance with ones of said database records associated with said respective event-affected device; and acquiring one or more additional event reports from said agents associated with a respective event-affected device.

7. The method of claim 6, modifying at least one of said records in said database during runtime.

8. The method of claim 6, displaying one or more of said received event reports.

9. The method of claim 6, performing a remedial action corresponding to at least one of said received event reports.

10. The method of claim 6, each said event request further including a start request field specifying one or more additional event requests that are generated when said event occurs.

11. The method of claim 6, each said event request further including a proxy field specifying an alternate agent for communicating with a particular device.

12. A computer system for monitoring a network of devices, comprising:

a plurality of agents, each agent in communication with one or more of said devices, each said agent used to ascertain information about one or more devices associated therewith; and a network management procedure that includes instructions to generate one or more event requests, each said event request associated with one of said devices, each said event request used to instruct a specified agent to poll a particular one of said devices to obtain a particular attribute value associated with said particular device;

transmit each said generated event request to a specified agent, receive one or more event reports from ones of said agents associated with event-affected devices, and automatically generate one or more additional event requests in response to each of a subset of said received event reports, each said additional event request associated with a specified one of said devices, each of a first subset of said additional event requests used to terminate a specified agent from polling a particular one of said devices, each of a second subset of said additional event requests used to obtain an additional attribute value associated with a specified device.

13. The system of claim 12, each of a third subset of said additional event requests used to designate a proxy agent to communicate with a specified one of said devices.

14. The system of claim 12, said network management procedure further including instructions to display one or more of said received event reports.

15. The system of claim 12, said network management procedure further including instructions to perform a remedial action corresponding to at least one of said received event reports.

16. A computer readable storage medium for storing data for access by programs being executed on a data processing system that is in communication with a plurality of agents, where each agent is in communication with one or more devices and each said agent is used to ascertain information about the one or more devices associated therewith;

said medium comprising:

a network management procedure that includes instructions to generate one or more event requests, each said event request associated with one of said devices, each said event request used to instruct a specified agent to poll a particular one of said devices to obtain a particular attribute value associated with said particular device;

transmit each said generated event request to a specified agent;

receive one or more event reports from ones of said agents associated with event-affected devices; and automatically generate one or more additional event requests in response to each of a subset of said received event reports, each said additional event request associated with one of said devices, each of a first subset of said additional event requests used to terminate a specified agent from polling a particular one of said devices, each of a second subset of said additional event requests used to obtain an additional attribute value associated with a particular device.

17. The medium of claim 16, each of a third subset of said additional event requests used to designate a proxy agent to communicate with a specified one of said devices.

18. The medium of claim 16, said network management procedure further including instructions to display one or more of said received event reports.

19. The medium of claim 16, said network management procedure further including instructions to perform a remedial action corresponding to at least one of said received event reports.

* * * * *